United States Patent [19]

Knaffl et al.

[11] Patent Number: 4,800,481

[45] Date of Patent: Jan. 24, 1989

[54] STATIC CONVERTER CIRCUIT AND METHOD FOR CONTROLLING IT

[75] Inventors: Berislav Knaffl, Wettingen; Peter Knapp, Oberehrendingen; Alfred-Christophe Rufer, Lauffohr; Urs Zürcher, Turgi, all of Switzerland; Birger Gotaas, Skedsmokorset, Norway

[73] Assignee: BBC Brown Boveri AG, Baden, Switzerland

[21] Appl. No.: 74,621

[22] Filed: Jul. 17, 1987

[30] Foreign Application Priority Data

Aug. 1, 1986 [CH] Switzerland ........................ 3102/86

[51] Int. Cl.[4] ........................................ H02M 7/17

[52] U.S. Cl. .................................... 363/70; 363/37; 363/43; 363/54

[58] Field of Search ...................... 363/43, 65, 69, 70, 363/35, 37, 54, 128, 136; 323/346

[56] References Cited

U.S. PATENT DOCUMENTS

| | | | |
|---|---|---|---|
| 3,477,016 | 11/1969 | Papaleonidas | 323/346 |
| 3,622,862 | 11/1971 | Boksjo | 363/54 |
| 3,938,031 | 2/1976 | Blackmond | 323/346 X |
| 4,159,513 | 6/1979 | Gemp et al. | 363/43 |
| 4,663,702 | 5/1987 | Tanaka | 363/65 |

OTHER PUBLICATIONS

"Brown Boveri Mitteilungen", Dec. 1987, vol. 66, Baden/Switzerland, pp. 763 to 777.

"Elektrische Bahnen", Mannheim/W. Germany, 45(1974)H.6, pp. 135 to 142.

*Primary Examiner*—Peter S. Wong

*Attorney, Agent, or Firm*—Werner W. Kleeman

[57] ABSTRACT

A static converter circuit has a voltage summing transformer (Tr–Tr13) with several part transformers (Tr1–Tr13) the static-converter-side winding of which are connected via one four-quadrant actuator each to a direct-voltage link circuit. The four-quadrant actuators are single-phase bridge circuits with one GTO thyristor each and a diode, which is antiparallel thereto, per bridge branch. The static-converter-side windings of the part transformers can be short circuited in each case by means of an alternating-current circuit breaker with antiparallel-connected thyristors. Each part transformer has a separate core. The power-system-side windings of the power transformers are connected in series and are connected at their ends to a railroad power system with 16⅔-Hz. The direct-voltage link circuit is connected via power-system-commutated static converters and a static converter transformer to a national power system with 50 Hz. For generating an approximately sinusoidal alternating voltage part voltages of equal amplitude which are supplied by the part transformers are added and/or subtracted step-by-step in the voltage summing transformer. Each thyristor of a four-quadrant actuator is turned-on and turned-off at the most, twice per period of the alternating voltage. This reduces power losses and expenditures for cooling the semiconductor components. The static converter circuit is suitable for frequency converters and reactive-power compensators.

7 Claims, 2 Drawing Sheets

STATIC CONVERTER CIRCUIT AND METHOD FOR CONTROLLING IT

BACKGROUND OF THE INVENTION

The invention relates to a static converter circuit having several static converters and having at least one transformer, the static-converter-side winding of which is effectively connected to the alternating-voltage connections of the static converter and the power-system-side winding of which is effectively connected to an alternating-current power system. The invention also relates to a method for controlling a static converter circuit.

The invention is based on the Swiss in-house journal "Brown Boveri Mitteilungen" 12 (1979), pages 763–777, as the closest prior art. According to this, it is known to feed converter locomotives with three-phase asynchronous motors from a 16⅔-Hz railroad power system via a direct-voltage link circuit. In this arrangement, the direct voltage is obtained from the railroad power system by means of a current summing transformer which has several part windings with a common transformer core and by means of several four-quadrant actuators connected to these part windings. The four-quadrant actuators are operated in sub-harmonic mode and need a relatively large inductance on the alternating-current side which is obtained with the aid of a high short-circuit voltage of the transformer of about 30%. Such transformers are expensive and have high energy losses in the copper parts.

Circuit and operation of a four-quadrant actuator are described in the German journal "Elektrische Bahnen" 6 (1974), pages 135–142. This circuit allows an alternating-current power system to be connected to a direct-voltage link circuit (link circuit with impressed voltage). Two four-quadrant actuators which are connected in parallel on the power-system side via one secondary transformer winding, each operate into a common link circuit. Control is effected by phase-shifted pulsing of the two four-quadrant actuators at a frequency of about 11.16⅔ Hz. As a result of this relatively high pulsing frequency, high energy losses are produced in the circuit components of the four-quadrant actuators.

REPRESENTATION OF THE INVENTION

The invention is based on the object of specifying a static converter circuit of the type initially mentioned and a method for operating it, which manage with less energy losses.

According to the invention, this object is achieved by the fact that the transformer is a voltage summing transformer which has several part transformers, each part transformer with its own magnetic core having at least one power system-side winding and at least one secondary-side winding, that the power-system-side windings of the part transformers, which are effectively connected to the alternating-voltage power system, are connected in series and that the static converter-side winding of each part transformer is effectively connected to a static converter. To generate an at least approximately sinusoidal alternating voltage with a predetermined frequency, the amplitude of this alternating voltage is formed by step-by-step addition and/or subtraction of part voltages of the same amplitude. The beginning and end of each voltage step are staggered in time in such a manner that the stairstep-shape generated by the voltage steps matches the sinusoidal shape. Each part voltage is generated by a separate part voltage source. The part voltage sources are switched-off in the same order in which they were switched-on, performing the stairstep shape. An advantage of the invention consists in the fact that the resultant circuit losses of the static converter are much smaller. As a result, a better efficiency of the static converter is obtained. Circuit and cooling of the static converter can be achieved in a simpler and more inexpensive manner. Another advantage consists in the fact that no increased inductance is required at the alternating-current output of the static converter. The voltage summing transformer can be constructed with a short-circuit voltage of the order of magnitude of 5% to 13% which is customary in static converter transformers. The reduction of the short-circuit voltage allows a more inexpensive construction and, above all, lower copper losses of the transformer, with the same dimensioning criteria.

According to an advantageous development of the invention, slightly lower losses of the thyristors and diodes of the four-quadrant actuator are also obtained. The reduction of the losses is shown in the example of a 700-kVA actuator which was planned for collecting current from the 16⅔-Hz railroad power system in a locomotive type and is pulsed with a frequency of 11.16⅔ Hz. Under full load, the semiconductor losses are about 3.2 kW and the circuit losses about 10 kW. If the same actuator switches on and off only once within the 16⅔-Hz halfwave period, the circuit losses are about 11-times smaller, that is to say, they are only about 0.9 kW.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

FIGS. **3*a* and 4*a* show the variation with time of alternating current and alternating voltage in the case of static converter circuits according to FIGS. 1 and 2; and with a different number of voltage steps.

DETAILED DESCRIPTION OF THE PREFERRED EMBODIMENTS

Figure 1:
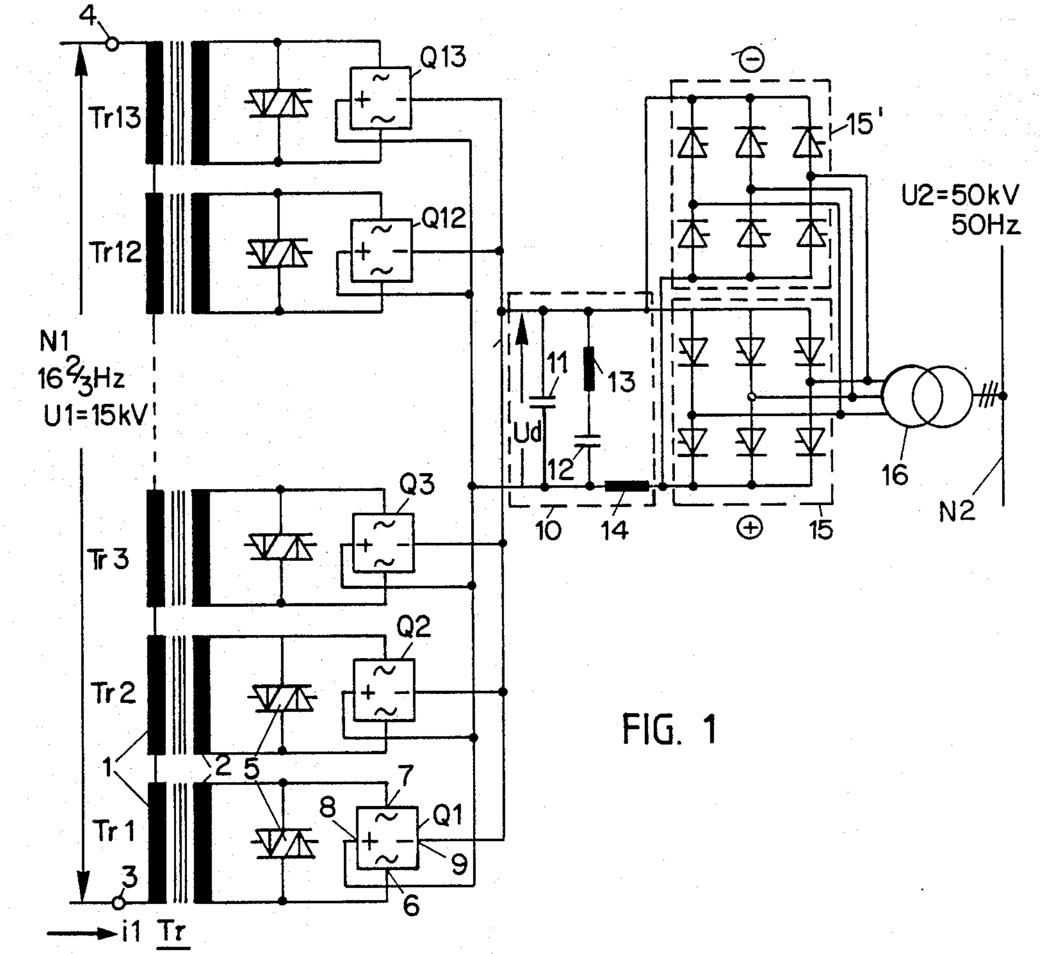
FIG. 1 shows a basic circuit diagram of an all-electronic frequency converter with a static converter circuit with voltage summing transformer and several four-quadrant actuators which are connected to it, and thyristor short-circuit switches.

In FIG. 1, a single-phase 16⅔-Hz railroad power system with an alternating voltage U1=15 kV is indicated with N1 and a three-phase 50-Hz national power system with an alternating voltage U2=50 kV is indicated with N2. A voltage summing transformer Tr consists of 13 part transformers Tr1, Tr2 . . . Tr13 which are of the same construction and dimensions and which in each case have separate transformer cores which are not magnetically coupled to each other. Each part transformer Tr1 . . . Tr13 has a power-system-side winding 1 and a static-converter-side winding 2. The power-system-side windings 1 of the part transformers Tr1–Tr13 are connected in series and are connected to the railroad power system N1 by means of terminals 3 and 4 at their ends. The alternating current for the power-system-side windings 1 is designated by i1. Each static-converter-side winding 2 of the part transformers Tr1 . . . Tr13 is connected via alternating-voltage connections 6 and 7 to a four-quadrant or static converter Q1 . . . Q13 and additionally specifically in parallel therewith to a thyristor short-circuit switch or alternating-current circuit breaker 5 with antiparallel thyristors. 8 designates "+" terminals and 9 designates "−" terminals of the four-quadrant actuators Q1 . . . Q13. A direct-voltage link circuit 10 has, between its positive and negative branch, a direct-voltage backup capacitor 11 and also a series resonant circuit with a series circuit of a series-resonant circuit capacitor 12 and a series resonant circuit reactor 13. The natural frequency of the series resonant circuit is tuned to twice the frequency of the railroad power system, that is to say, $33\frac{1}{3}$ Hz so that power pulsations produced in feeding the railroad power system N1 are transferred to the three-phase 50-Hz national power system N2 only within a tolerable extent. In the positive branch of the direct voltage link circuit 10, a smoothing reactor 14 is provided which, on the one hand, is connected to each positive terminal 8 of the four-quadrant actuator or static converter Q1 . . . Q13 and, on the other hand, to the negative branch of a static converter 15 and of the positive branch of a static converter 15'. The negative branch of the direct-voltage link circuit 10 is connected, on the one hand, to all negative terminals 9 of the four-quadrant actuators or static converters Q1 . . . Q13 and, on the other hand, to the positive branch of the static converter 15 and to the negative branch of the static converter 15'. The static converters 15 and 15' are power system commutated bridge rectifiers connected in antiparallel with respect to one another, with thyristors in the bridge branches. The alternating-current connections of these static converters 15 and 15' are connected to the alternating-voltage power system N2 via a static converter transformer 16.

The construction of one of the single-phase four-quadrant actuators or static converters Q1 . . . Q13 of identical construction can be seen in FIG. 2. Identical parts are given identical reference symbols.

Each four-quadrant actuator or static converter Q1 . . . Q13 has four bridge branches with one gate-turn-off (GTO) thyristor T1 . . . T4 per bridge branch. On the one hand, thyristors T1 and T2 and, on the other hand, thyristors T3 and T4 are connected in series, the anodes of the thyristors T1 and T3 being connected to the positive terminal 8 via fuses 21*a* and 21*b*, respectively, and the cathodes of the thyristors T2 and T4 being connected to the negative terminal 9 via fuses 21*c* and 21*d*, respectively. A diode D1 . . . D4 is connected in antiparallel with each of the thyristors T1 . . . T4. In addition, each thyristor T1 . . . T4 has a thyristor RC circuit or a turn-off voltage limiting circuit 17 of identical construction. The turn-off voltage limiting circuit 17 has an Rc circuit diode 18 in series with an RC circuit capacitor 20, the RC circuit diode 18 and the thyristor, for example T3, being of the same polarity. An Rc circuit resistor 19 is connected in parallel with the RC circuit diode. The junctions of the thyristors T1 and T2 are connected to the alternating-voltage connection 6 and the junctions of thyristors T3 and T4 are connected to the alternating-voltage connection 7. The alternating voltage is designated by $U_Q$ and the alternating current of each such four-quadrant actuator or static converter Q1 . . . Q13 is designated by $i_Q$.

The frequency converter described in conjunction with FIG. 1 is suitable for transmitting power from a three-phase national power system N2 to a single-phase railroad power system N1 and vice versa and it is designed for a power of, for example, 10 MW. If power is to be transferred only from the national power system N2 into the railroad power system N1, the static converter 15' can be omitted.

In normal operation, only 12 four-quadrant actuators or static converters Q1 . . . Q12 are involved in forming the $16\frac{2}{3}$-Hz alternating voltage. The 13th four-quadrant actuator or static converter Q13 is provided as instantaneous backup, its thyristors remaining cut off and the alternating-current circuit breaker 5 being continuously switched on or one of the two thyristors of the alternating-current circuit breaker 5 being continuously in a state of conduction. The $16\frac{2}{3}$-Hz alternating voltage U1 is formed by summing the voltages induced in the individual power-system-side windings 1 of the voltage summing transformer Tr as can be seen from FIGS. 3 and 4.

Connecting all power-system-side windings 1 of the voltage summing transformer Tr in series has the effect that, with a current i1 through the power-system-side windings 1, a current must flow at the same time in all static-converter-side windings 2. If all winding pairs are identical (identical number of windings and identical transformation ratio), the current in all static-converter-side windings 2 must also have identical magnitude and identical polarity.

Figure 2:
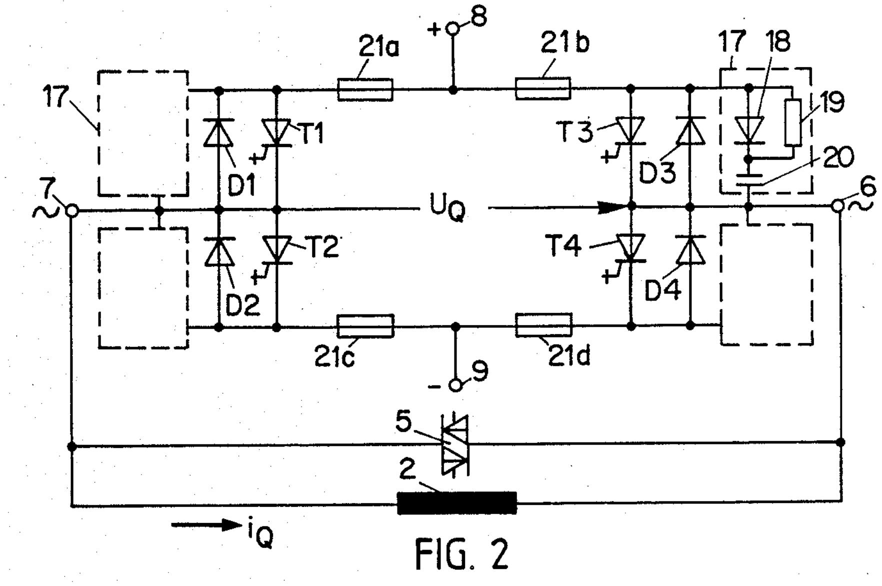
FIG. 2 shows a basic diagram of a four-quadrant actuator with thyristor short-circuit switch and actuator-side winding of the voltage summing transformer according to FIG. 1.

To explain the action of the static converter circuit, switching states Z1 . . . Z8 of a four-quadrant actuator or static converter Q1 . . . Q12 according to FIG. 2 are first defined, specifying the direction of the current flow. For the sake of simplicity, only the reference symbols of the components and input terminals or poles of the four-quadrant actuator or static converter through which the current successively flows, are specified from left to right.

Switching state Z1: $U_Q>0$, $i_Q>0$
Direction of current flow: 8-21*a*-T1-2-T4-21*d*-9
Switching state Z2: $U_Q>0$, $i_Q<0$
Direction of current flow: 9-21*d*-D4-2-D1-21*a*-8
Switching state Z3: $U_Q<0$, $i_Q>0$
Direction of current flow: 0-21*c*-D2-2-D3-21*b*-8
Switching state Z4: $U_Q<0$, $i_Q<0$
Direction of current flow: 8-21*b*-T3-2-T2-21*c*-9
Switching state Z5: $U_Q=0$, $i_Q>0$
Direction of current flow: T1-2-D3-21*b*-21*a*-T1
Switching state Z6: $U_Q=0$, $i_Q>0$
Direction of current flow: T4-21*d*-21*c*-D2-2-T4
Switching state Z7: $U_Q=0$, $i_Q<0$
Direction of current flow: T3-2-D1-21*a*-21*b*-T3
Switching state Z8: $U_Q=0$, $i_Q<0$
Direction of current flow: T2-21*c*-21*d*-D4-2-T2

The action of the static converter circuit will now be explained with the aid of FIGS. 3 and 4, using as a basis, for the sake of simplicity, a voltage summing transformer Tr having only five part transformers Tr1 to Tr5 and associated five four-quadrant actuators or static converters Q1 to Q5. The transformation ratio of the winding pairs 1 and 2 of the part transformers Tr1 to Tr5 is assumed to be 1:1.

In FIGS. 3*a* and 4*a*, alternating current i and alternating voltage U are plotted along the ordinate and time t is plotted along the abscissa in arbitrary units. The power-system-side alternating voltage U1 of the voltage summing transformer Tr is formed step by step, the variation with time of the added voltage steps formed by means of the four-quadrant actuators or static converters Q1 to Q5 being formed in such a way that the sum, approximated, produces a sinusoidal shape. In the examples selected, the alternating current i1 is phase shifted by 30° with respect to the alternating voltage U1.

In FIGS. 3*b* to 3*f* and 4*b* to 4*f*, the alternating voltage $U_Q$ of the four-quadrant actuators or static converters Q1 to Q5 are represented along the ordinate and time t is represented along the abscissa in units of FIGS. 3*a* and 4*a*.

Figure 3:
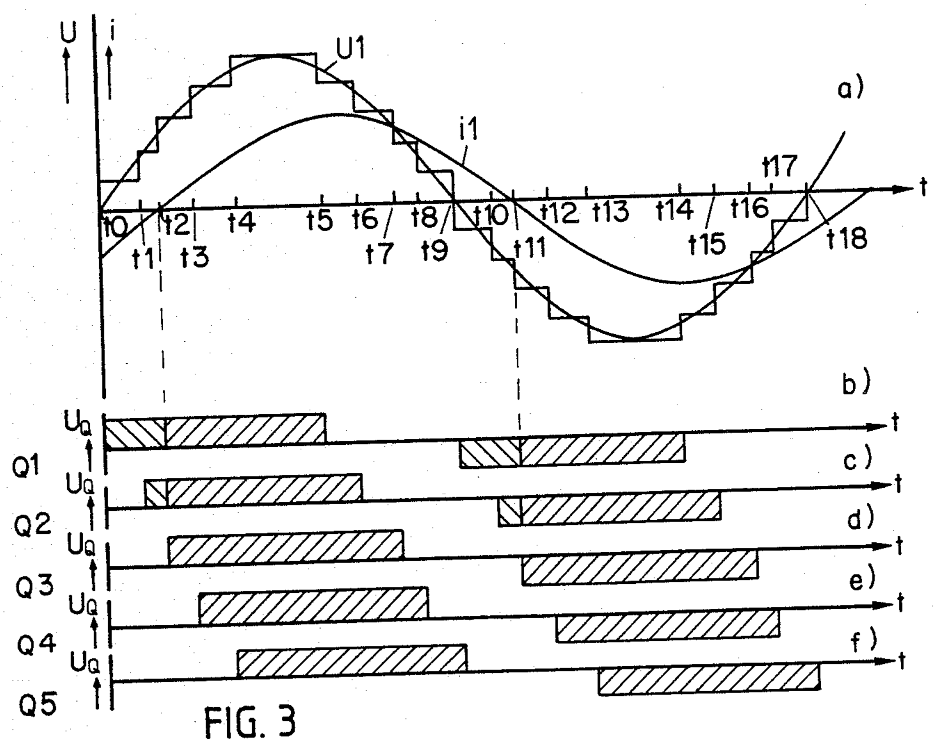
FIGS. 3*b* to 3*f* and FIGS. 4*b* to 4*f* show the variation with time of switching states of the five static converter circuits according to the alternating current and the alternating voltage of FIGS. 3*a* and 4*a***, respectively.
Figure 4:
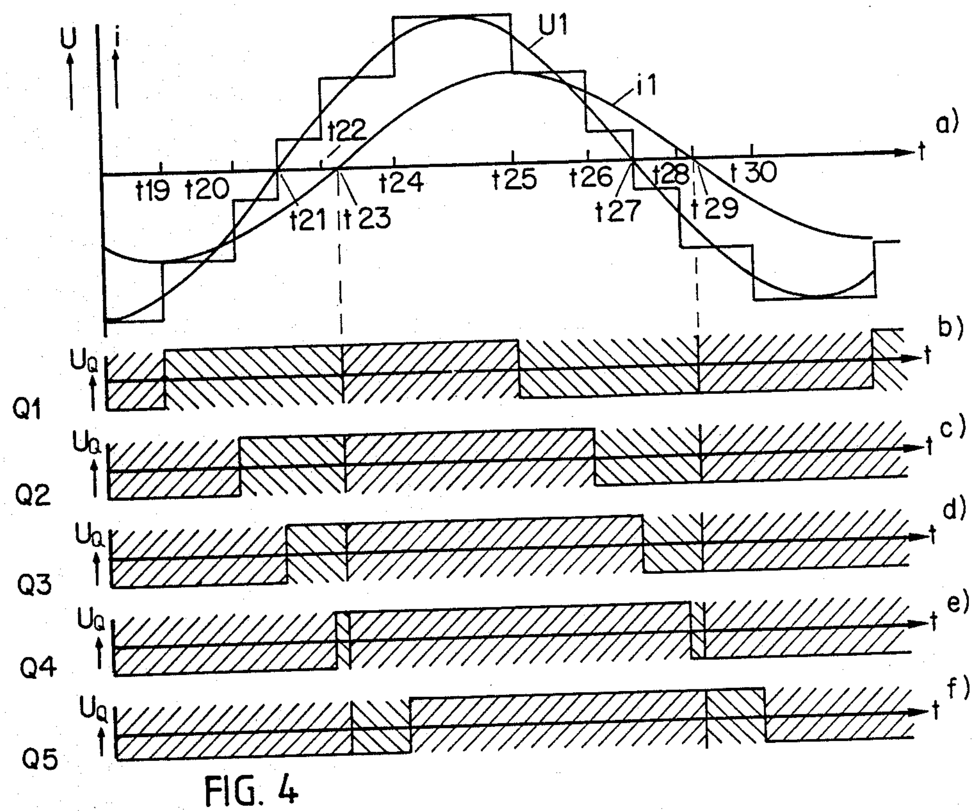

In the illustrative embodiment of FIG. 3, in which thyristors T1 and T4 and T3 and T2 in diagonal bridge branches of a four-quadrant actuator or static converter Q1 to Q5 are not fired at the same time for the state of $U_Q=0$, the number of voltage steps is twice as large as in the illustrative embodiment of FIG. 4 in which the thyristors in diagonal bridge branches are always fired at the same time.

In the illustrative embodiment of FIG. 3, the four-quadrant actuators or static converters Q2 to Q5 do not generate an alternating voltage $U_Q$ at time t0 (switching states Z5 or Z6) whereas the four-quadrant actuator or static converter Q1 changes from switching state Z5 or Z6 into switching state Z2 and transfers an alternating voltage $U_Q$=Ud via part transformer Tr1 to the power-system-side winding 1 of the voltage summing transformer Tr, which corresponds to the first voltage step in FIG. 3*a*.

At time t1, the four-quadrant actuator or static converter Q2 changes from switching state Z5 or Z6 to switching state Z2 by the conducting thyristors T1 or T4 being cut off, compare FIG. 3*c*, which corresponds to the second voltage step in FIG. 3*a*. At time t2, the alternating current i1 changes its sign from "−" to "+" so that the four-quadrant actuators or static converters Q1 and Q2 change from switching state Z2 to switching state Z1 and thyristors T1 and T4 take over conduction of the alternating current $i_Q$ instead of diodes D1 and D4. At the same time, the four-quadrant actuator or static coonverters Q3, compare FIG. 3*d*, switches from switching state Z5 or Z6 to switching state Z1, which corresponds to the third voltage step in FIG. 3*a*. The same switching-over occurs with four-quadrant actuators or static converters Q4 and Q5 at times t3 and t4, compare FIGS. 3*e* and 3*f*, which corresponds to the 4th and 5th voltage step in FIG. 3*a*. At time t5, the four-quadrant actuator or static converters Q1 changes from switching state Z1 to switching state Z7 or Z8, with $U_Q=0$. For the four-quadrant actuators or static converters Q2 . . . Q5, this transition occurs at times t6 . . . t9.

The operation for the negative half period of the alternating voltage U1 corresponds to that for the positive half period. At times t9 and t10, the four-quadrant actuators or static converters Q1 and Q2, respectively, change from switching state Z7 or Z8 into switching state Z3 and, after the zero transition of the alternating current i1 at time t11, into switching state Z4. The four-quadrant actuators or static converters Q3 . . . Q5 change from switching state Z7 or Z8 to switching state Z4 at times t11 . . . t13. At times t14 . . . t18, the four-quadrant actuators or static converters Q1 . . . Q5 change to switching state Z5 or Z6.

The following switching states are used at the same time or, preferably, alternately so that the semiconductor components through which current flows are loaded as uniformally as possible and thus are heated as little as possible: Z5 with Z6 and Z7 with Z8. An alternating drive arrangement can be omitted with the appropriate overdimensioning.

In the illustrative embodiment of FIG. 4, the switching states with $U_Q=0$ are missing. As in FIGS. 3*b* to 3*f*, areas shaded to the left indicate switching states in four-quadrant actuators or static converters in which only diodes are conducting in FIGS. 4*b* to 4*f*. In areas shaded to the right, only thyristors are conducting the current.

At times t19 to t22, the four-quadrant actuators or static converters Q1 to Q4 are successively switched from switching state Z4 to Z2. At time t23, the alternating current i1 changes its sign from "−" to "+" and the four-quadrant actuators or static converters Q–Q4 change from the conducting-diode switching state Z2 to the conducting-thyristor switching state Z1. The four-quadrant actuator or static converter Q5 changes from the conducting-thyristor switching state Z4 to the conducting-diode switching state Z2. At time t24, the four-quadrant actuator or static converter Q5 changes from switching state Z2 to switching state Z1. At times t25 to t28, the thyristors are successively turned off in the four-quadrant actuators or static converters Q1 to Q4 so that these four four-quadrant actuators or static converters Q1 to Q4 change to switching state Z3. At time t29, the alternating current i1 changes its sign from "+" to "−", the four-quadrant actuators or static converters Q1 to Q4 changing to switching state Z4 and the four-quadrant actuator or static converter Q5 changing to switching state Z2. At time t30, the four-quadrant, actuator or static converter Q5 also changes to switching state Z4.

Operation of the four-quadrant actuators or static converters Q1 . . . Q5 in accordance with FIG. 4, compared with that in accordance with FIG. 3, has the advantage that each four-quadrant actuator or static converter Q1 . . . Q5 is switched on and off only once during one period of the alternating voltage U1. This reduces the power losses in the four-quadrant actuators or static converters Q1 . . . Q5. The thyristor RC circuit 17, and particularly the RC circuit resistor 19, can be designed for a lower power. The expenditure for cooling the semiconductor components is reduced. Driving the thyristors is simpler. A disadvantageous factor is the lower number of voltage steps which results in an inferior match with the desired sinusoidal shape of the alternating voltage U1 to be generated. This problem is not of great significance if there is a sufficient number of four-quadrant actuators or static converters and with high total powers. A further disadvantage consists in greater power losses in iron parts of the part transformers Tr1 . . . Tr13 since the four-quadrant actuators or static converters Q1 . . . Q13 operate without zero-voltage operating state. As a result, each part transformer Tr1 . . . Tr13 must always be loaded virtually up to nominal inductance. At low frequencies such as, for example, $16\frac{2}{3}$-Hz, however, iron losses are not so important. Comparatively greater power losses occur in the power lines or power rails between the four-quadrant actuators or static converters Q1 to Q13 and to the direct-voltage link circuit 16. In contrast, no current flows to the link circuit in zero-voltage switching states Z5 to Z8 in the operating mode in accordance with FIG. 3.

The operating mode of the static converter circuit according to FIG. 4 shall be again briefly explained with the simplifying assumption that alternating current i1 and alternating voltage U1 are in phase in the power-system-side windings 1 of the voltage summing transformer Tr and the 13th part transformer Tr13, as instantaneous backup, is not involved in forming the voltage. At a given time, the current at 7 of a total of 12 four-quadrant actuators or static converters Q1 . . . Q12 is assumed to flow through the thyristors which are capable of conducting the current of the positive half-wave, switching state Z1. When the thyristors of the remaining 5 four-actuators or static converters are cut off, the current flow from their associated actuator-side static-converter-side part transformer windings 2 is force via the blocking diodes into the positive section of the direct-voltage link circuit 10. For this purpose, their transformer windings 2 must produce the necessary voltage which is higher than the link circuit voltage Ud. With a transformation ratio of 1:1 of the winding pairs 1, 2, a counter voltage which is of equal magnitude is generated in the power-system-side windings 1 of the relevant five winding pairs. The instantaneously induced total voltage U1 in the power-system-side windings 1 of the voltage summing transformer Tr thus corresponds to twice the value of the link circuit voltage Ud, namely 7.Ud−5.Ud=2.Ud.

When the thyristors of a four-quadrant actuator or static converters, which has been cut off until then, are fired at an appropriate time, its current will be commutated from the blocking diodes to the thyristors. At the same time, the current polarity of this four-quadrant actuator in the connections between the four-quadrant actuator or static converters and the direct-voltage link circuit 10 changes. The current polarity in the windings of the voltage summing transformer Tr remains unchanged and only the voltage polarity of the respective winding pair 1, 2 is changed. Thus, the new instantaneous induced total voltage U1 in the power-system-side windings 1 of the voltage summing transformer Tr will reach a value of four times the link circuit voltage Ud, a value of 8.Ud−4.Ud=4.Ud. Further thyristors of the four-quadrant actuators or static converters which have conducted the current via blocking diodes up until then, are turned-on in further corresponding time intervals. At the end, all 12 four-quadrant actuators or static converters Q1 . . . Q12 will conduct the current via thyristors. At this time, the instantaneous induced total voltage in the power-system-side windings 11 of the voltage summing transformer Tr corresponds to 12-times the value of the link circuit voltage Ud.

In the manner described, a stairstep-shaped voltage curve can be formed from 0 up to the amplitude value in the power-system-side windings 1 of the voltage summing transformer Tr. The induced total voltage in the power-system-side windings 1 of the voltage summing transformer Tr is reduced from the amplitude value to zero by time-displaced turn-off actions of the thyristors of the four-quadrant actuators or static converters Q1 to Q12 which change the voltage polarity in the power-system-side windings 1 of the associated winding pairs 1, 2 and should thus reduce the total voltage. The negative half-wave is formed in accordance with the positive one, the thyristors and blocking diodes of the four-quadrant actuators or static converters Q1 to Q12 handling the negative current half-wave then becoming active.

Since in most cases, the currents and voltages in the power-system-side windings 1 of the voltage summing transformer Tr are not in phase in real operation, each current zero transition will always require a change in the instantaneous combination of four-quadrant actuators or static converters with respect to current conduction through thyristors or blocking diodes, respectively.

A change in the power-system current i1 is always connected with a rigidly coupled current change in all part transformer winding pairs 1, 2. Accordingly, the voltage summing transformer Tr ca be built with a normal short-circuit voltage of, for example, 5% and the current shape does not become inferior to that with a conventional four-quadrant actuator or static converter which is coupled by means of a transformer with increased short-circuit voltage of, for example, 30% and operates in the sub-harmonic mode. This allows the transformer costs and copper losses to be reduced, leading to an improvement of the overall efficiency.

Each turn-on or turn-off action of the thyristors of one of the 12 four-quadrant actuators or static converters Q1 to Q12 results in a change of the induced instantaneous total voltage value in the power-system-side windings 1 of the voltage summing transformer Tr corresponding to 1/6 of the amplitude value. This relatively small voltage step must cause a change in the current in all windings of the voltage summing transformer Tr. The stray inductances of all windings will retard the current changes correspondingly. This produces a strong current smoothing effect which contributes to the fact that the current shape, and thus also the voltage shape across the power-system-side output terminals 3, 4 of the voltage summing transformer Tr, contains less harmonics and can be better adapted to the sinusoidal curve with appropriate drive to the four-quadrant actuators or static converters Q1 to Q12. In addition to the formation of the stairstep-shape voltage, the system described here also allows the possibility of line control. For this purpose, at least one preselected four-quadrant actuators or static converter Q1 to Q13 (for example, the back-up stage) would have to be designed in conventional lay-out for pulse-mode operation, that is to say with elaborate RC circuitry. It is not necessary to have an increased short-circuit voltage of the part transformer winding pair 1, 2 of this four-quadrant actuator or static converter Q13 since this four-quadrant actuator or static converter, too, is only fractionally involved in the formation of the instantaneous value of the total voltage and in the distortion of the total current.

In emergency operation, the alternating volate U1 can also be controlled without pulsing one of the four-quadrant actuators or static converter Q1 to Q13 by extending the current conduction period of individual stages. However, this results in a higher harmonics content in the induced fundamental voltage oscillation.

Since the individual winding pairs 1, 2 of the voltage summing transformer Tr operate in the operating mode of a static converter, care must be taken to ensure that the circuit of none of the static converter-side windings 2 can remain open in disturbance cases, for example, when thyristors or blocking diodes of a four-quadrant become defective and this circuit is disconnected by fuses from the system on the link circuit and transformer side. For this purpose, an electric valve or thyristor short-circuiter 5 for both current directions is installed at each static-converter-side transformer winding 2. The thyristors of the electric valve or thyristor short-circuiter 5 must always have automatic, self-firing emergency firing circuits which automatically cause the electric valve or thyristor short-circuiter 5 to become conductive when a predeterminable maximum voltage is exceeded. This maximum voltage must be slightly higher than the maximum operating voltage of the direct-voltage link circuit 10. As is generally known, the emergency firing circuits are in most cases implemented by means of breakover diodes which become conductive when a particular voltage is reached and fire the thyristor via the normal firing circuit.

In addition to the emergency firing circuits, the short-circuiter thyristors can be equipped with additional firing circuits which allow a desired firing at any time. This allows the alternating-current circuit breakers 5 alternatively to be used for control purposes, during the zero voltage formation $U_Q=0$ of a four-quadrant actuator or static converters connected therewith, corresponding to the aforementioned switching states Z5 to Z8. The alternating-current circuit breaker or short-circuiter 5 is then turned-on during the appropriate time intervals. At the same time, the firing signals for the four-quadrant actuators or static converters, which are otherwise required for such switching states Z5 to Z8, are omitted.

Since only one semiconductor component in each case conducts current in the alternating-current circuit breaker or short-circuiter 5, in comparison with two current-conducting semiconductor components in the switching states Z5 to Z8, the power losses are reduced during these in time intervals.

In general, the amplitude of the alternating voltage of a four-quadrant actuator or static converter Q1 . . . Q13 is controlled either by controlling the link circuit direct voltage Ud, for example, by gating control of the power-system-commutated 50-Hz input converter 15 or by the preselected one of the four-quadrant actuators or static converters Q1 to Q13 which operates in pulsed mode with a higher frequency. The drive system for the other four-quadrant actuators or static converters is handled by another control system which is responsible for voltage shape and phase relationship at the power-system-side terminals 3 and 4 of the voltage summing transformer Tr.

INDUSTRIAL USEFULNESS

The static converter circuit according to the invention is suitable for transmitting power in both directions, that is to say, from the alternating-voltage power system N1 to the alternating-voltage power system N2 and the reverse, preferably within a power range from 5 MW–20 MW.

Naturally, both power systems can be multi-phase systems. In this case, one voltage summing transformer Tr with part transformers Tr1 . . . Tr13 and associated four-quadrant actuators or static converters Q1 . . . Q13 and alternating-current circuit breakers or short-circuiters 5 must be provided for each phase of the alternating current. More or less than 13 part transformers Tr1 to Tr13 can also be used for each voltage summing transformer Tr.

The static converter circuit can also be used for frequency converters of three-phase power systems, for example, 50 Hz/60 Hz or 60 Hz/25 Hz and so forth.

Instead of conventional thyristors, gate turn-off (GTO) thyristors or, for smaller currents, transistors can be used in the alternating-current circuit breaker or short-circuiters 5. Naturally, conventional thyristors with quenching circuits or transistors can be used instead of GTO thyristors in the four-quadrant actuators or static converters Q1 to Q13. If required, several thyristors can be connected in series and/or parallel.

The static converter circuit enables power transmission to be achieved in the capacitive and inductive region, independently of the direction of power transmission, that is to say, it can also be used as reactive-power compensator. The static converter circuit can be operated in parallel with other voltage sources in the power system. Operation of the static converter circuit from virtually zero up to full load is possible without drastic reduction in efficiency and without significant increase of the harmonics content.

While there are shown and described present preferred embodiments of the invention, it is to be distincty understood that the invention is not limited thereto, but may be otherwise variously embodied and practiced within the scope of the following claims. ACCORDINGLY,

What we claim is:

1. A static converter circuit, comprising:

a voltage summing transformer;

said voltage summing transformer containing a predetermined number of part transformers;

each one of said part transformers containing a magnetic core which is magnetically decoupled from the magnetic cores of the remaining ones of said predetermined number of part transformers;

a predetermined number of static converters;

each one of said part transformers containing at least one power-system-side winding and at least one static-converter-side winding;

said at least one power-system-side windings of said predetermined number of part transformers being series-connected;

an alternating power system;

said series-connected power-system-side windings of said predetermined number of part transformers being operatively connected to said alternating power system;

said at least one static-converter-side winding of each one of said predetermined number of part transformers being connected to a respective one of said predetermined number of static converters; and at leat one electric valve connected in parallel with said at least one static-converter-side winding of each one of said predetermined number of part transformers between said at least one static-converter-side winding and an associated one of said predetermined number of static converters.

2. The static converter circuit as defined in claim 1, wherein:

each one of said predetermined number of part transformers contains an individual magnetic core which constitutes a magnetically separate magnetic core and thus is magnetically decoupled from said remaining magnetic cores.

3. The static converter circuit as defined in claim 1, wherein:

said predetermined number of part transformers contain respective part magnetic cores of a common magnetic core; and said part magnetic cores being magnetically decoupled from each other and thus constituting said magnetically decoupled magnetic core.

4. Static converter circuit as claimed in claim 1, wherein the electric valve is a thyristor-type alternating-current circuit breaker (5).

5. A method of controlling a static converter circuit, comprising the steps of:

generating an at least approximately sinusoidal alternating voltage of a predetermined frequency;

forming direct-voltage steps of equal magnitude and summing-up such direct-voltage steps in order to form an amplitude of said at least approximately sinusoidal alternating voltage;

staggering in time the beginnings and the ends of said direct-voltage steps in order to thereby obtain a stepwise direct-voltage variation which is matched to the at least approximately sinusoidal alternating voltage;

using a predetermined number of individual voltage sources for generating a predetermined number of said direct-voltage steps;

said step of staggering in time the beginnings and the ends of said direct-voltage steps including the steps of turning-on said predetermined number of individual voltage sources in a predetermined time sequence and turning-off said predetermined number of individual voltage sources substantially in said predetermined time sequence in order to thereby generate said stepwise direct-voltage variation which at least approximately matches said sinusoidal alternating voltage; and activating each one of a predetermined number of electric valves connected in parallel with said predetermined number of individual voltage sources at a preselected operative state of a respective one of said predetermined number of individual voltage sources.

6. The method as defined in claim 5, wherein:

said step of using said predetermined number of individual voltage sources for generating said predetermined number of direct-voltage steps entails generating each one of said direct-voltage steps by means of a static converter and feeding said direct-voltage step to a static-converter-side winding of a part transformer connected with said static converter.

7. The method as defined in claim 6, wherein:

said steps of turning-on and turning-off said predetermined number of individual voltage sources in said predetermined time sequence includes pulsing at a predetermined frequency each one of said static converters connected in circuit in said predetermined number of individual voltage sources; and pulsing a preselected static converter connected in circuit with a preselected one of said predetermined number of individual voltage sources for finely controlling said stepwise direct-voltage variation.

* * * * *